United States Patent [19]

Sieffert

[11] Patent Number: 5,457,778
[45] Date of Patent: Oct. 10, 1995

[54] IMAGING APPARATUS USING REUSABLE SOFTWARE ARCHITECTURE AND METHOD OF PROVIDING SOFTWARE CONTROL FOR A PLURALITY OF IMAGING PRODUCTS

[75] Inventor: Kent J. Sieffert, Minneapolis, Minn.

[73] Assignee: Minnesota Mining and Manufacturing Company, St. Paul, Minn.

[21] Appl. No.: 161,749

[22] Filed: Dec. 2, 1993

[51] Int. Cl.$^6$ .................................................. G06F 15/00
[52] U.S. Cl. .................... 395/162; 364/188; 353/27 R
[58] Field of Search ................................. 395/155, 111, 395/160–166, 275, 144, 325, 145, 600, 115; 364/188; 353/25, 27 R, 27 A

[56] References Cited

U.S. PATENT DOCUMENTS 5,142,667  8/1992  Dimperio et al. ...................... 395/115

*Primary Examiner*—Mark R. Powell
*Assistant Examiner*—Kee M. Tung
*Attorney, Agent, or Firm*—Gary L. Griswold; Walter N. Kirn; William D. Bauer

[57] ABSTRACT

An imaging apparatus using a reusable software architecture implemented in to significantly cut development time and costs while providing flexibility for implementation of a wide variety of imaging apparatus. An imaging apparatus in which software control is separated into discrete modules and in which many of the modules may be reused in subsequent apparatus to create new imaging apparatus. An apparatus where software reuse is facilitated by the ability to remove a single module or a subtree consisting of many modules by breaking a single communication link. Software control is provided for a plurality of imaging products utilizing reusable software control modules. A method of providing software control for a plurality of imaging products is disclosed. Separate and independent software modules control input media, image retrieval, image placement, output media and the user interface. A separate product executive software module governs and synchronizes each of the separate and independent software control modules. Only the product executive software module needs to be unique for each separate new imaging apparatus. The product executive means has only one-way downward communication with each of the separate and independent software control modules. Preferably, all communication is transparent as provided by a remote procedure call. There is no direct communication between each of the separate and independent software control modules.

8 Claims, 13 Drawing Sheets

$\beta =$ 
$$\frac{\text{PRINT REQ *IP\_WARM *CARD MODE* NOT VIEW MODE}}{\begin{array}{c}\text{OM\_REQUEST\_PRINT}\\\text{IP\_READY\_IMAGER}\\\text{AP\_READY\_RETRIEVER}\\\text{AP\_SET\_MAG}\\\text{DISABLE ES TIMER}\\\text{DISABLE RESET TIMER}\end{array}}$$ OR $$\frac{\text{PRINT REQ *IP\_WARM *PAPER MODE* DH WARM}}{\begin{array}{c}\text{OM\_REQUEST\_PRINT}\\\text{IP\_READY\_IMAGER}\\\text{(DH\_STAGE)}\\\text{DISABLE ES TIMER}\\\text{DISABLE RESET TIMER}\end{array}}$$ OR $$\frac{\text{CH\_CRDLD*PRINT REQ}}{\begin{array}{c}\text{OM\_REQUEST\_PRINT}\\\text{IP\_READY\_IMAGER}\\\text{AP\_READY\_RETRIEVER}\\\text{AP\_SET\_MAG}\\\text{DISABLE ES TIMER}\\\text{DISABLE RESET TIMER}\end{array}}$$

$\alpha =$ 
$$\frac{\text{SE\_ERROR\_STATE>3}}{\text{SYSEXEC\_SHUTDOWN}}$$ OR $$\frac{\text{CLEAR/ABORT REQUEST}}{\begin{array}{c}\text{UI\_UNLOCK}\\\text{(AP\_STOP\_SCAN)}\\\text{(DH\_ABORT\_COPY)}\\\text{ENABLE ES TIMER}\\\text{ENABLE RESET TIMER}\end{array}}$$

$\gamma =$ 
$$\frac{\text{CH\_CRDLD*VIEW REQUEST}}{\text{AP\_ENABLE\_VIEW}}$$ OR $$\frac{\text{VIEW REQUEST}}{\text{AP\_LOAD\_CARD}}$$ OR $$\frac{\text{CLEAR/ABORT REQUEST* VIEW MODE}}{\text{AP\_DISABLE\_VIEW}}$$

*Fig. 5B*

IMAGING APPARATUS USING REUSABLE SOFTWARE ARCHITECTURE AND METHOD OF PROVIDING SOFTWARE CONTROL FOR A PLURALITY OF IMAGING PRODUCTS

TECHNICAL FIELD

The present invention relates generally to imaging apparatus and, more particularly, to imaging apparatus having process driven software control architecture and methods for providing software control for imaging apparatus.

BACKGROUND OF THE INVENTION

One area in which imaging apparatus are utilized is in the area of handling engineering drawings. Such imaging apparatus utilize network printers, blackline copiers, card film plotters, quantimatic printers, duplicators and camera stations. The core technology involved with engineering drawing imaging apparatus is the precise, high speed reproduction of large format drawings ranging from 8.5 inches (21.6 centimeters) by 11 inches (27.9 centimeters) to 34 inches (85.4 centimeters) by 44 inches (111.8 centimeters). Typically, the large format drawings are manipulated as digital images or micrographic reductions. Examples of apparatus are large format digital network printers, blackline copiers, card film plotters, quantimatic printers, duplicators and camera stations.

Modern imaging equipment typically contains different hardware control components which are controlled by software. As an example, a microfilm card reader performs the function of handling microfilm cards that are used as input media for the imaging apparatus. The process steps that the microfilm card reader performs are controlled by software. Software commands control the individual operations of the reader. A software command typically tells the reader to move and stop the microfilm card, set the exposure of lamp brightness, sets power mode, performs diagnostics, eject the microfilm card, etc.

Imaging apparatus conventionally provides input media control, image retrieval, output media control, image placement and a user interface. Often the software control of one function is dependent upon the results or status of another function. For example, the image retrieval function is dependent upon the input media control to properly input and position a microfilm card before the image can be extracted from the microfilm card. Similarly, the output media cannot properly generate and output the output media, such as a print, before the image placement function has completed the task of properly placing the image onto the output media.

Often a new imaging apparatus must be designed to perform a particular imaging function involved in the handling of engineering size drawings. A new imaging apparatus may use a different form of input media control, image retrieval, image placement or output media control.

Designing or creating a new imaging apparatus then requires the rewriting of the software which controls the individual elements of the imaging apparatus. Since many of the individual functions of the imaging apparatus are interrelated with other functions, whenever one of the functions change, the software controlling the imaging apparatus must be substantially or completely rewritten to achieve overall function of the new imaging apparatus.

Thus, a new imaging apparatus requires a substantial amount of software development requiring a substantial amount of lead time to create the new imaging apparatus and a substantial cost in development.

SUMMARY OF THE INVENTION

A reusable software architecture is implemented in an imaging apparatus, preferably an engineering drawing imaging apparatus, to significantly cut development time and costs while providing flexibility for implementation of a wide variety of imaging apparatus.

The present invention provides an imaging apparatus in which software control is separated into discrete modules and in which many of the modules may be reused in subsequent apparatus to create new imaging apparatus. The present invention also provides an apparatus for providing software control for a plurality of imaging products utilizing reusable software control modules. The present invention also provides a method of providing software control for a plurality of imaging products.

Separate and independent software modules control input media, image retrieval, image placement, output media and the user interface. A separate product executive software module governs and synchronizes each of the separate and independent software control modules. Only the product executive software module needs to be unique for each separate new imaging apparatus.

This software architecture provides the ability to remove any size subtree by simply breaking a single communication path. If by moving from one imaging product to another imaging product, a faster print engine is installed, the single communication path between a product executive module and an output media module can be broken allowing the output media module and its associated subtree to be replaced by a new output media module and its associated subtree of software tasks (modules).

The product executive means has only one-way downward communication with each of the separate and independent software control modules. There is no direct communication between each of the separate and independent software control modules, thus eliminating dependencies inherent to the imaging process.

In one embodiment, the present invention is an imaging apparatus, controllable by a user, for receiving input media containing an image, retrieving the image from the input media, placing the image onto an output media and outputting the output media. An input media control module is adapted to receive the input media providing software control to receive the input media containing the image. An image retrieval module retrieves the image from the input media. An image placement module places the image onto the output media. An output media control module outputs the output media. A user interface module allows the user control over the apparatus. A product executive module governs and synchronizes each of the input media control module, the image retrieval control module, the image placement module, the output media control module and the user interface module. The product executive module has one-way downward communication with each of the input media control module, the image retrieval control module, the image placement module, the output media control module and the user interface module. There is no direct communication between the input media control module, the image retrieval control module, the image placement module, the output media control module and the user interface module. Each of the input media control module, the image retrieval control module, the image placement module, the output media control module and the user interface module are independent of each other.

In another embodiment, the present invention is an apparatus for providing software control for a plurality of imaging products, each of the plurality of products using a particular process. A reusable input media control module is adapted to receive the input media and provides software control to receive the input media containing the image. A reusable image retrieval module retrieves the image from the input media. A reusable image placement module places the image onto the output media. A reusable output media control module outputs the output media. A reusable user interface module allows the user control over the apparatus. A product executive module, unique for each of the plurality of products, governs and synchronizes each of the input media control module, the image retrieval control module, the image placement module, the output media control module and the user interface module. The product executive module initiates all communication with each of the input media control module, the image retrieval control module, the image placement module, the output media control module and the user interface module. The product executive module has one-way downward communication with each of the input media control module, the image retrieval control module, the image placement module, the output media control module and the user interface module. Software control is separated into discrete modules and in which many of the modules may be reused in subsequent apparatus to create new imaging apparatus. There is no direct communication between the input media control module, the image retrieval control module, the image placement module, the output media control module and the user interface module. Each of the input media control module, the image retrieval control module, the image placement module, the output media control module and the user interface module are independent of each other.

In another embodiment, the present invention is a method of providing software control for a plurality of imaging products, each of the plurality of products using a particular process. Reusable input media control software is created and adapted to receive the input media providing software control to receive the input media containing the image. Reusable image retrieval software is created for retrieving the image from the input media. Reusable image placement software is created for placing the image onto the output media. Reusable output media control software is created for outputting the output media. Reusable user interface software is created for allowing the user control over the apparatus. Product executive software, unique for each of the plurality of products, is created for governing and synchronizing each of the input media control software, the image retrieval control software, the image placement software, the output media control software and the user interface software. The product executive software initiates all communication with each of the input media control software, the image retrieval control software, the image placement software, the output media control software and the user interface software. The product executive module has one-way downward communication with each of the input media control module, the image retrieval control module, the image placement module, the output media control module and the user interface module. There is no direct communication between the input media control software, the image retrieval control software, the image placement software, the output media control software and the user interface software. Each of the input media control software, the image retrieval control software, the image placement software, the output media control software and the user interface software are independent of each other.

Preferably, all communication is transparent as provided by a remote procedure call,

BRIEF DESCRIPTION OF THE DRAWINGS

The foregoing advantages, construction and operation of the present invention will become more readily apparent from the following description and accompanying drawings in which.

DETAILED DESCRIPTION OF THE PREFERRED EMBODIMENTS

A typical imaging apparatus, including but not limited to an engineering drawing imaging apparatus, can be divided into five separate functional process components. These five separate functional process components are input media control, image retrieval, image placement, output media control and user interface.

Each functional process component can be controlled by software specifically written to control that individual functional process component. The software for each of these five separate functional process components can be written to be independent of each other. Further, each of these five separate functional processes can be divided into smaller functionally independent modules. Each small functionally independent module can be recursively divided into even smaller functionally independent modules.

All software modules, regardless of size, preferably have identical interfaces.

Figure 1:
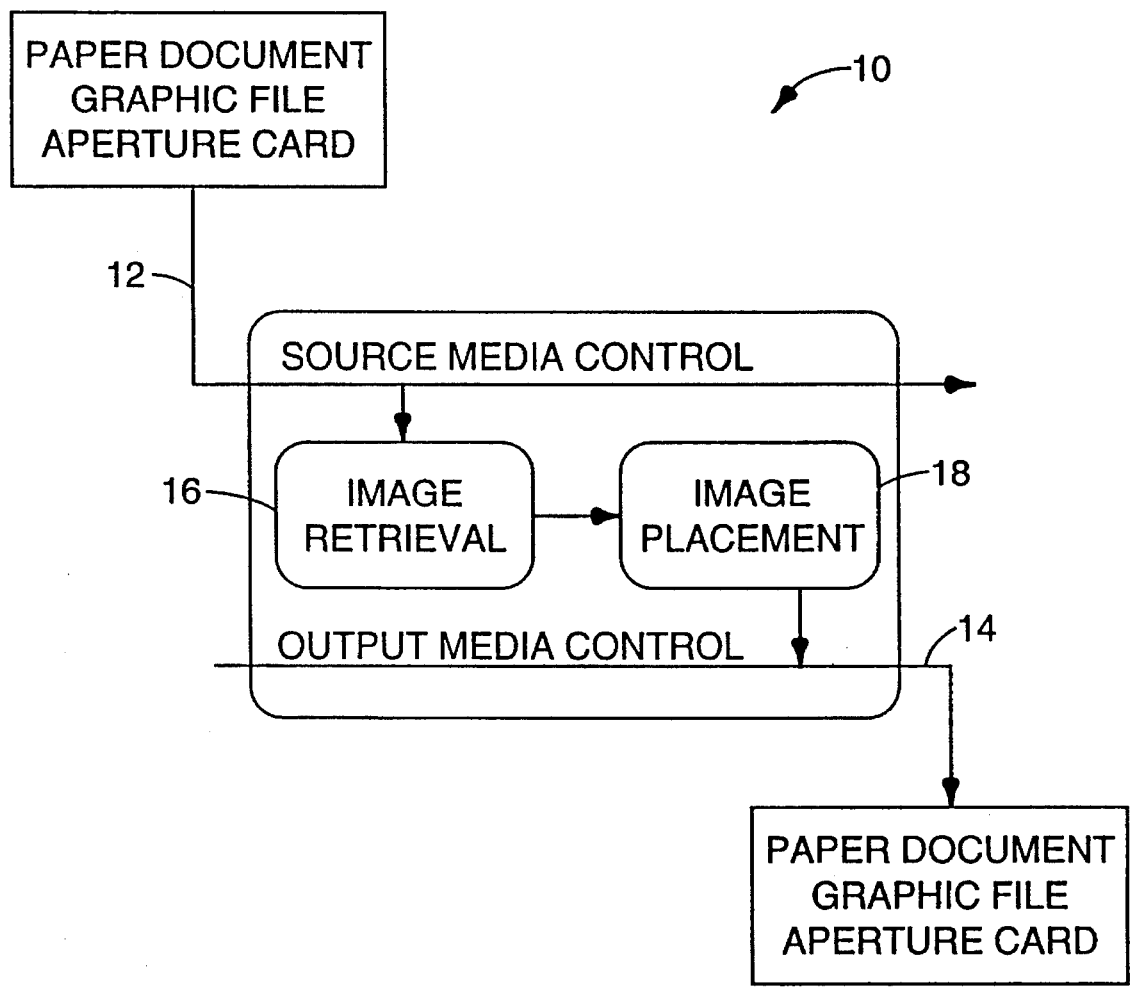
FIG. 1 is a block diagram illustrating the separate functional processes involved in an imaging apparatus of the present invention.

The separation of these separate functional processes for a typical imaging apparatus 10 is illustrated in FIG. 1. A typical imaging apparatus 10 involves a source media control 12, an output media control 14 and image retrieval control 16 and image placement control 18 in between the source media control 12 and output media control 14. Source media control 12 controls the input media such as a paper document, a graphics file or an aperture card. Output media control 14 controls the output media such as a paper document, a graphics file or an aperture card.

Figure 2:
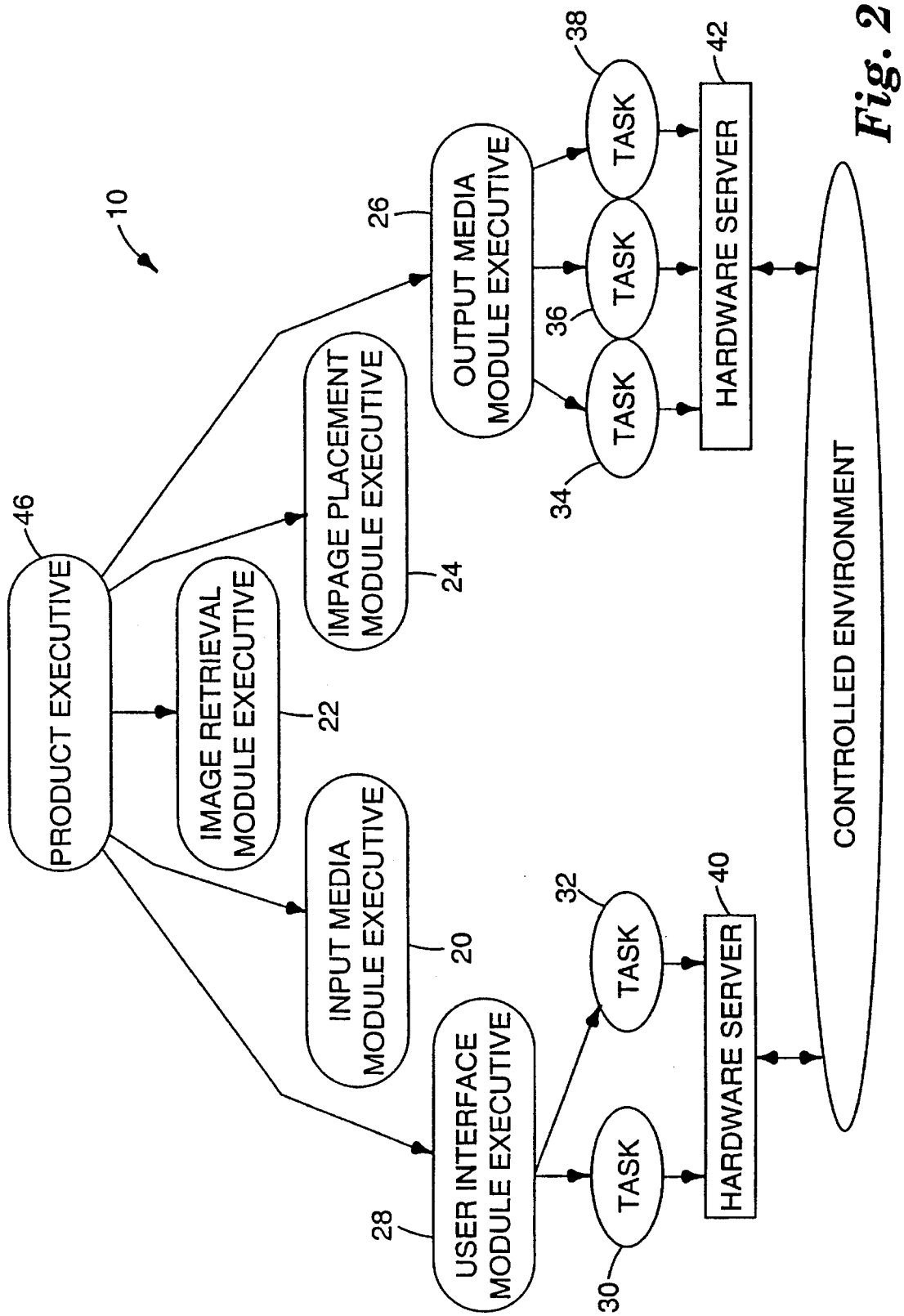
FIG. 2 is a block diagram illustrating the software architecture of an imaging apparatus of the present invention.

The modular software architecture is illustrated in FIG. 2. The input media control 12 process (FIG. 1) is controlled by an input media module 20. The image retrieval control 16 process (FIG. 1) is controlled by image retrieval module 22. The image placement control 18 process (FIG. 1) is controlled by image placement module 24. The output media control 14 process (FIG. 1) is controlled by output media module 26. In addition, a user interface process is controlled by user interface module 28. Modules 20, 22, 24, 26 and 28 are written to be independent of each other.

Input media control module 20 consists of software written specifically to control a particular input media function. For example, a particular input media control module 20 may be written to control the input of an aperture card. Another input media control module 20 may be written to control the input of a graphics file. A particular input media control module 20 is then selected to match of operating requirements of the particular imaging apparatus 10 being constructed.

Similarly, output media control module 26 consists of software written specifically to control a particular output media function. For example, a particular output media control module 26 may be written to control the output of an aperture card. Another output media control module 26 may be written to control the output of a graphics file. A particular output media control module 26 is then selected to match of operating requirements of the particular imaging apparatus 10 being constructed.

By analogy, image retrieval control module 22 consists of software written specifically to control the image retrieval function of the specific imaging apparatus 10 being constructed. Similarly, image placement control module 24 consists of software written specifically to control the image placement function of the specific imaging apparatus 10 being constructed. If a different imaging apparatus 10 has different image retrieval or image placement functional requirement, then a different image retrieval module 22 and/or image placement module 24 may be created or selected from among those already written.

A user interface module 28 consists of software written specifically to control the particular user interface required of the imaging apparatus 10 being constructed. If a different imaging apparatus 10 has different user interface requirements, then a different user interface module 28 may be created or selected from among those already written.

Each of the individual modules 20, 22, 24, 26 and 28 may also be divided into a plurality of tasks. For example, user interface module 28 may be divided into tasks 30 and 32. For example, output media module 26 may be divided into tasks 34, 36 and 38. Similarly, input media module 20, image retrieval module 22 and image placement module 24 may also be divided into smaller individual tasks (not shown). Each individual task (30–38) is written to be independent of all other tasks (30–38). Although not illustrated in FIG. 2, each individual task (30–38) may be further subdivided into still smaller independent tasks. Eventually, either tasks (30–38) or their further subdivisions operate to control hardware servers 40, 42. Each individual function including the relevant module and all associated tasks can be referred as an individual subtree. Hardware servers may be an output display or keyboard input, in the case of user interface tasks 30, 32 or may be media movement control motors or electrophotographic printers in the case of output media module tasks 34, 36, 38. The resultant operation of hardware servers 40, 42 defines the controlled environment 44 that evidences the defined function and operation of imaging apparatus 10.

Each individual module (20–28) and task (30–38) is written to be independent of all other modules and tasks. Since each module and task is independent, each may selected to be part of any required imaging apparatus 10 without regard to the presence or absence of any other module or task. Thus, each module or task may be reused for another imaging apparatus 10 performing another function. Since each module may be easily reused in another environment, that module need not be rewritten for each new imaging apparatus. Any module may be interchanged to quickly form a new imaging apparatus 10. Since the lower level tasks are also independent, they too can be easily reused.

Each module (30–38) has its own thread of execution and its own state, i.e., program counter, register set and stack.

It is projected that up to eighty percent of the software modules can be reused of new imaging apparatus making the creation of new products much faster and less expensive. Further, software development of new modules not previously developed is made easier and faster since each module is independent of all other modules. This increases software programmer productivity and efficiency. Still further, this software architecture increases the ease of maintenance and serviceability of the software modules. Since the entire imaging apparatus 10 is recursively divided into smaller functionally independent modules, any required software modifications or corrections are isolated to a single module and can be accomplished with little impact to the rest of the apparatus.

A product executive module 46 is written to define the required interaction between each of the five independent modules 20, 22, 24, 26 and 28. Preferably, there is a single product executive module 46 for any given imaging apparatus 10. The product executive module 46 is responsible for governing and synchronizing all other modules (30–38) and their associated tasks, essentially all subtrees of the imaging apparatus 10.

The product executive module 46 is the only module that is written specifically for each individual imaging apparatus 10. The product executive module 46 is the only module knowledgeable of the exact functional process taking place in the imaging apparatus at each imaging stage. The product executive module 46 would know, for example, that the input media module 20 is actually controlling a high speed network controller and that the output media module 26 is controlling a wide format print engine. The interface between the product executive module 46 and the other various process modules is simple and precise. Typical commands from the product executive module 46 to one of the other modules may be "start the input media" or "terminate imaging". As a result of this simple interface, the size of the product executive module is inherently small and, thus, the amount of product, i.e., particular imaging apparatus 10, specific software code is minimized.

A key element if the software architecture employed in the present invention is the "downward only" communication interface. All communication from one module or task to another can only be initiated from the layer above. Stated another way, all communication from one module to another module or task can only be initiated from the module or task immediately above. This communication interface is represented in FIG. 2 by the downward only pointing arrows connecting the product executive module 46 to the other modules (30–38), from user interface module 28 to task 30 and task 32 and from output media module 26 to task 34, task 36 and task 38. Preferably, this pattern is repeated throughout the entire software architecture. Each software layer is acting as a server to the software layer above it and as a client to the software layer below it. This means that any given software layer does not know who, i.e., which software module, is controlling it. There are no dependencies between a module and any module above it. Furthermore, there is no communication across imaging modules, e.g., there can be not direct communication between input media module 20 and image retrieval module 22.

This software architecture provides the ability to remove any size subtree by simply breaking a single communication path. If by moving from one imaging product 10 to another imaging product 10, a faster print engine is installed, the single communication path between product executive module 46 and output media module 26 can be broken allowing the output media module 26 and its associated subtree to be replaced by a new output media module 26 and its associated subtree of software tasks (modules). Preferably, the same is true at any level of the software architecture. By breaking one communication path, any software module can be removed and interchanged quickly. Simply because of the fact that a subtree of any size can be removed, the software architecture facilitates large component as well as fine-grain software reuse.

Figure 3:
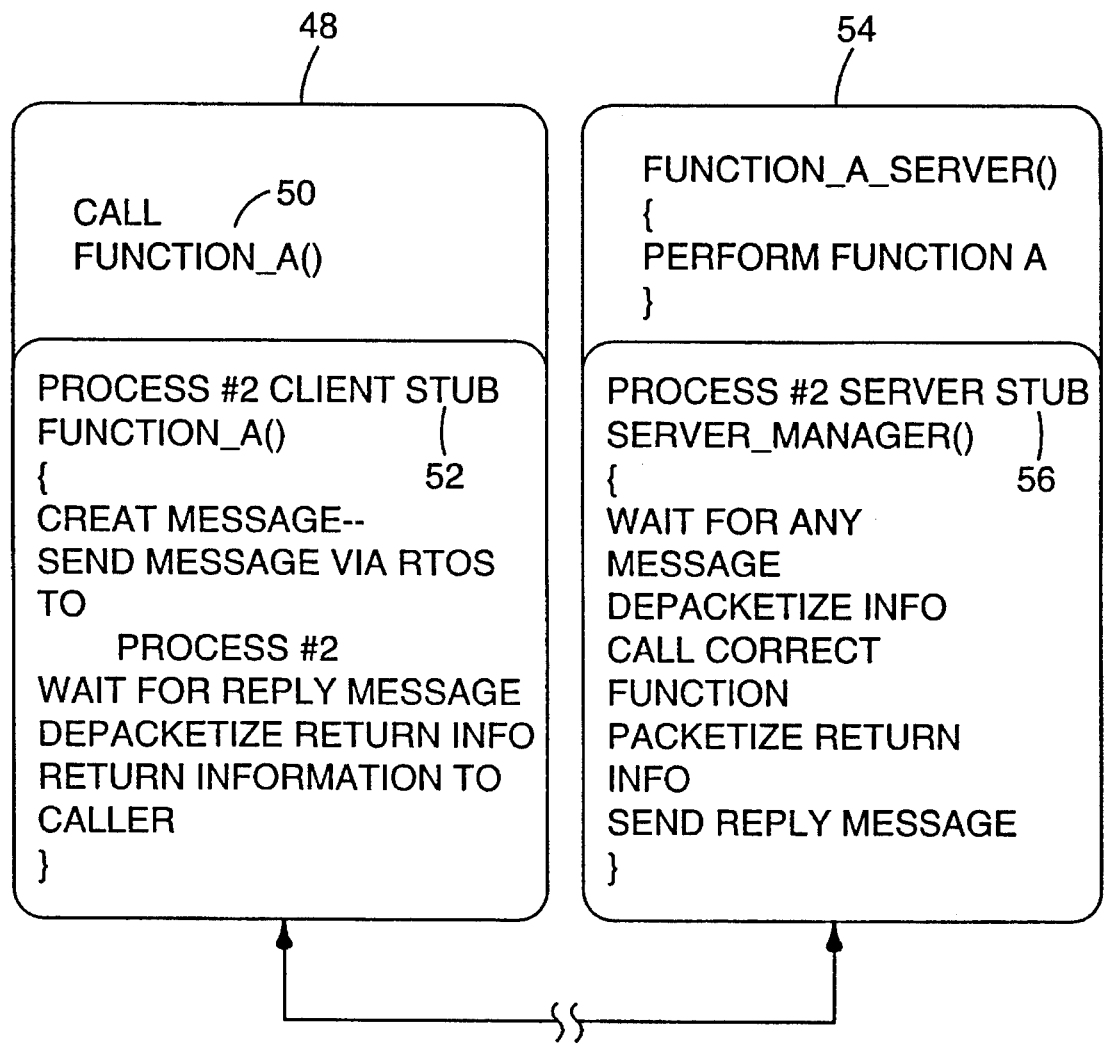
FIG. 3 is a functional block diagram illustrating the process of a remote procedure call.

In general, one level of software communicates with the level of software below it by use remote procedure calls. A remote procedure call is a common communication mechanism often used in complex distributed systems. As shown in FIG. 3, the process being performed by module 48 wishes to perform some operation, e.g., enabling a clutch or opening a shutter, simply calls the desired function 50. A layer of software residing in module 48, known as the client stub 52, traps the function call. The client stub 52 determines that the software code needed to perform the called operation actually exists in a separate process space, module 54. The client stub 52 then creates a message 56 enclosing any passed data from the function call 50 along with the correct packetizing and addressing to reach module 54. The client stub 52 then sends the message to module 54 via the real time operating system. At this point, the message is received by a layer of software code residing in module 54 known as the server stub 56. The server stub 56 strips apart the message and actually calls the correct local function with any data pulled from the message. The local function executes as if it were called locally, returning any information requested. The server stub 56 then takes the return information, creates a return message and sends the return message to module 48. The client stub 52 in module 48 receives the return message, pulls out the return information and passes the information to the local software code in module 48 which called the function 50. The local software code in module 48 then continues unaware that any inter-module communication occurred.

A remote procedure call as implemented in the software architecture of the present invention is an effective mechanism for the independent software modules to function unaware that other software even exist.

Figure 4:
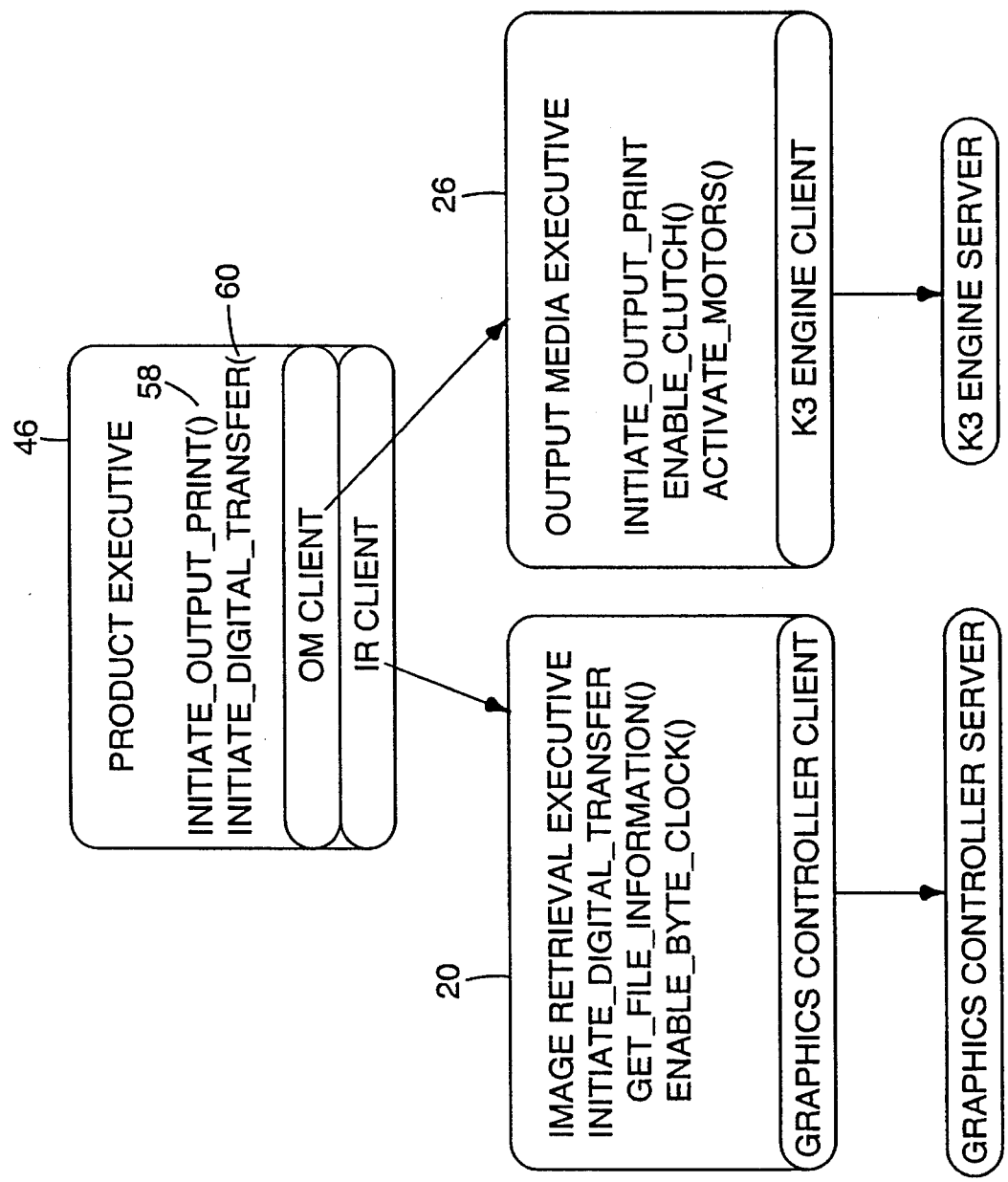
FIG. 4 is a functional block diagram illustrating the process of remote procedure calls implemented with software modules utilized in the present invention.

FIG. 4 illustrates the remote procedure call mechanism as implemented in the software architecture and imaging apparatus 10 of the present invention. The product executive module 46 is starting the output media and the input media by making two function calls (remote procedure calls). The messages from the product executive module 46 are routed automatically to the proper module. In this case initiate output print 58 function call is routed to output media module 26 and initiate digital transfer 60 function call is routed to image retrieval module 20. Output media module 26 and input media module 20, acting as servers, perform the function the initiate output print 58 function and initiate digital transfer 60 function, respectively. Output media module 26 and input media module 20 then issue their own function calls to activate lower level hardware.

Since the hardware components can be controlled by lower level software modules (tasks), the remote procedure call mechanism traps these function calls and routes them to the correct hardware servers. In this case, output media module 26 and input media module 20 now unknowingly act as clients to the lower level servers. Constructed in this way, the software architecture of the imaging apparatus 10 of the present invention is recursively constructed of client/server relationships interacting by the transparent remote procedure call communication mechanism.

Since all communication paths are downward from one software level to a lower level software module, there is no message initiated by a software level intended for a higher level software module. Instead, information that is necessary to communicated to a higher level software module, is simply made available to any software module through the use of a state semaphore. For example, the input media module 20 may make available the knowledge of the presence of the input media at a specific location, by setting a state semaphore announcing that the input media is in position for the image to be retrieved. The information from this state semaphore is available to all software modules and is not dependent upon the existence of any higher level software modules. Through this mechanism, and the others described herein, each software module is kept independent of higher level software modules.

The product executive module 46 performs the following based tasks:

1. Upon power up, starts the operating system and then starts the imaging apparatus 10 system executive;
2. Upon start-up, the system executive starts any lower level hardware drivers which are needed for the rest of the system function, including a clock driver, an analog to digital converter and an interlock monitor;
3. Next, the system executive starts the user interface and shared block are retrieved for each module and provided to user interface module 28;
4. After collecting the shared data blocks, the system executive starts each module (20–28); and
5. The system executive enters the main state for imaging apparatus 10.

Because the product executive module 46 is the highest level software module of imaging apparatus 10, there are no remote procedure calls into product executive module 46. Also product executive module 46 produces no state semaphores.

An example of an implementation of an imaging apparatus using the software modules (20–28) is illustrated by reference to the following exemplary modules.

Product Executive Module

Figure 5A:
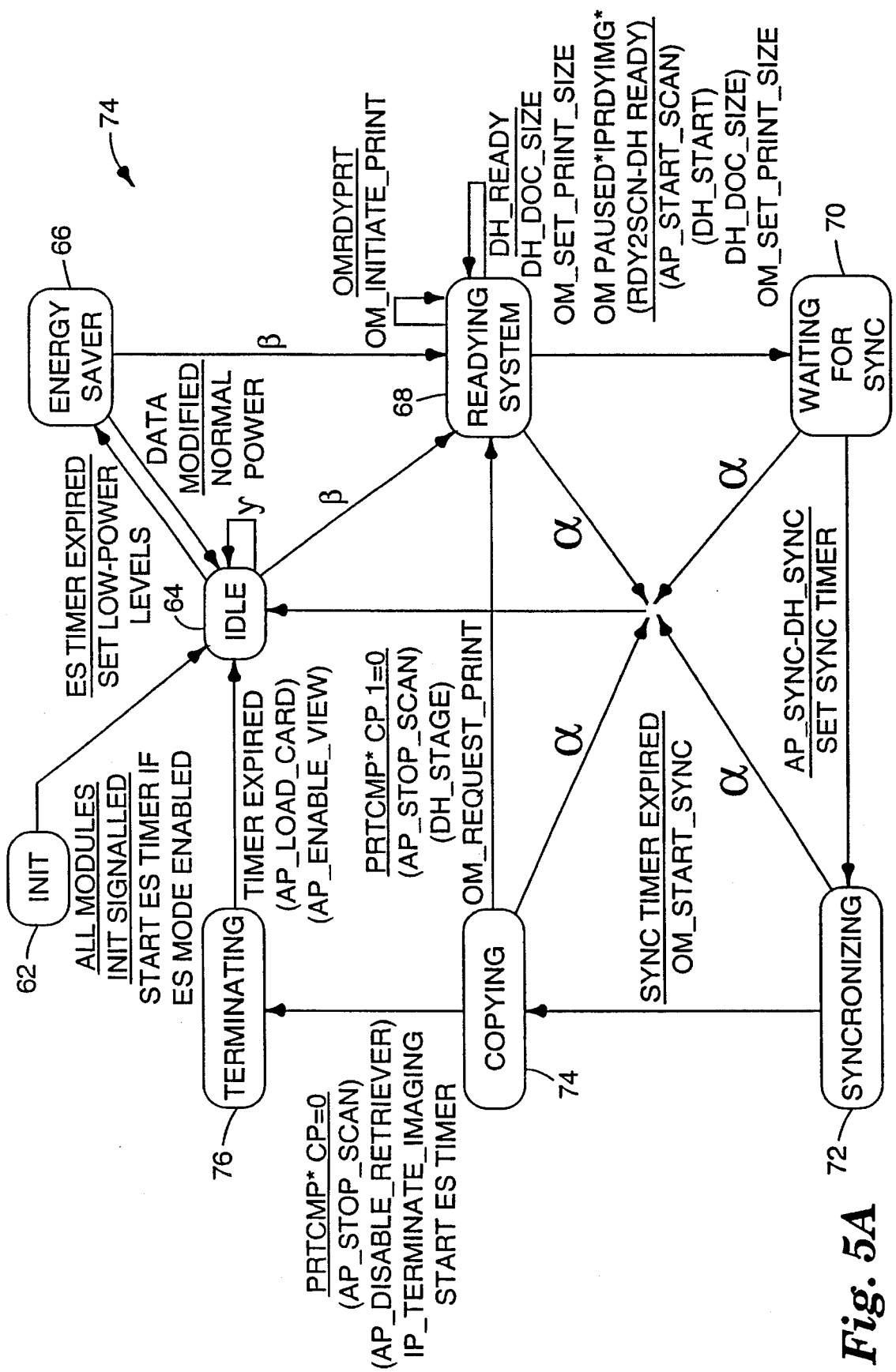
FIG. 5 is a state diagram of the product executive module of a preferred embodiment of an imaging apparatus of the present invention.

FIG. 5 illustrates the function of product executive module 46 through its state diagram. "Init" state 62 is entered at power up. During "Init" state 62, the entire system is initializing. In order to transition from this state to "Idle" state 64, all of software modules must be initialized. The state semaphores from each software module indicating successful initialization must have been received by product executive module 46. Upon receiving all five of these state semaphores, the "Idle" state 64 is entered and the reset timer and energy saver timer are started.

There are two valid transitions from "Idle" state 64. First, if the energy saver timer expires, the "Energy Saver" state 66 is entered. Second, if a print request is made, the "Readying System" state 68 is entered if 1) image placement module 24 is at temperature and the imaging apparatus 10 is in micrographic mode and a user is currently viewing a micrographic card or 2) image placement module 24 is at temperature and imaging apparatus 10 is in blackline mode and the document handler lamps are at temperature or 3) a card load state semaphore is received with a print request pending.

Upon transition to "Readying System" state 68, several instructions are issued. First, output media module 26 is instructed to ready the print media. Second, image placement module 24 is instructed ready the imaging system. Next, if imaging apparatus 10 is in micrographic mode, image retrieval module 22 is instructed to stop viewing the micrographic card and to ready the micrographic optical path. Image retrieval module 22 is informed of the correct magnification. If imaging apparatus 10 is in blackline mode, output media module 26 is instructed to load the document and transport it to the rear of the imaging apparatus 10. Finally, the energy saver timer and the reset parameters timer are disabled.

In "Idle" state 64, there are several events which are valid but which do not cause transition. First, the time to reset the parameters may expire causing the system executive to reset certain parameters. Second, the user may request to view a card. In this case, input media module 20 is instructed to load a micrographic card. Third, a card load semaphore may be received indicating that the card was successfully loaded. If a view request was pending, then the card is viewed. If a print request was pending, then the transition to the print cycle is performed as described above.

In "Readying System" state 68, the system executive is waiting for responses from the modules indicating that the printing process may begin. When output media module 26 signals the state semaphore that the output media is ready, an initiate print command is immediately provided to output media module 26. This causes the output media to be moved to its synchronization point.

Two transitions are possible from "Readying System" state 68. First, the "Waiting for Sync" state 70 is entered when 1) the output media is paused and 2) image placement module 24 is ready and 3) if either image retrieval module 22 is ready or the document is staged, the input media is set in motion. If the mode is blackline, then the print size is obtained from output media module 26 or else the print size is set by the user's choice of standard output sizes. The print size is then given to output media module 26. Second, the occurrence of a system error level greater than three causes an immediate transition to "Idle" state 64.

In "Waiting for Sync" state 70, imaging apparatus 10, the input media is moving toward its synchronization point. When the synchronization semaphore is received, the synchronization timer is set. The length of time depends upon the optical path, leading margins, possible leading edge skip and registrations. The timer is responsible for aligning the image from the input media with the correct position on the output media. Once the synchronization timer is set, a transition is made to "Synchronizing" state 72. The occurrence of a system error level greater than three causes an immediate transition to "Idle" state 64.

During "Synchronizing" state 72, imaging apparatus 10 is waiting a precise amount of time in order to align the image from the input media with the correct placement on the output media. When the timer expires, the output media module 26 is instructed to immediately begin the movement of the output media through the system. A transition is then made to "Copying" state 74. The occurrence of a system error level greater than three-causes an immediate transition to "Idle" state 64.

The print process is completing during "Copying" state 74. When output media module 26 has produced the requested size output print, a semaphore is set and two valid transitions are possible from "Copying" state 74.

First, if the total number of copies have been printed, a transition is made to "Terminating" state 76. While making this transition, the image placement module 24 is instructed to terminate the image cycle. Next, if the print mode is micrographic, image placement module 24 is instructed to stop the scanning process and to disable the retriever. Finally, the energy saver timer is started if it is enabled and the reset parameters timer is started.

Second, if more copies need to be made of the same input media, a transition is made to "Readying System" state 68. Before making the transition, the input media module 20 is instructed to stop the current scanning process. The output media module 26 is instructed to request print to ensure that the output media module 26 is ready for another print cycle. If the print mode is blackline, the output media module 26 is instructed to restage the current original document.

A third transition which is possible at any time during "Copying" state 74 is to transition immediately to "Idle" state 64 upon the occurrence of a system error level greater than three.

During "Terminating" state 76, imaging apparatus 10 is waiting for the image to finish transferring to the output media. The image has already been retrieved from the input media, however, the end of the image still resides on the photoconductive drum. After 1.0 seconds, a terminate imaging command is issued to terminate the imaging process. A transition is then made to "Idle" state 64. If the mode is micrographic, then one of two situations occurs. First, if the system was viewing a card when the print request was received, then the system returns to viewing the same card. Second, if the system was not viewing a card and autofeed was enabled, the input media module 20 is instructed to load the next card. If the card is successfully loaded, then the print process is entered again. In this manner, the entire deck of cards can be printed.

When "Energy Saver" state 66 is active, imaging apparatus 10 is consuming minimum power. The only transition from "Energy Saver" state 66 is activity from the user. If any key press is detected, a return is made to "Idle" state 64. During this transition, imaging apparatus is returned to normal power. The energy saver timer is also restarted.

Input Media Module

Figure 6:
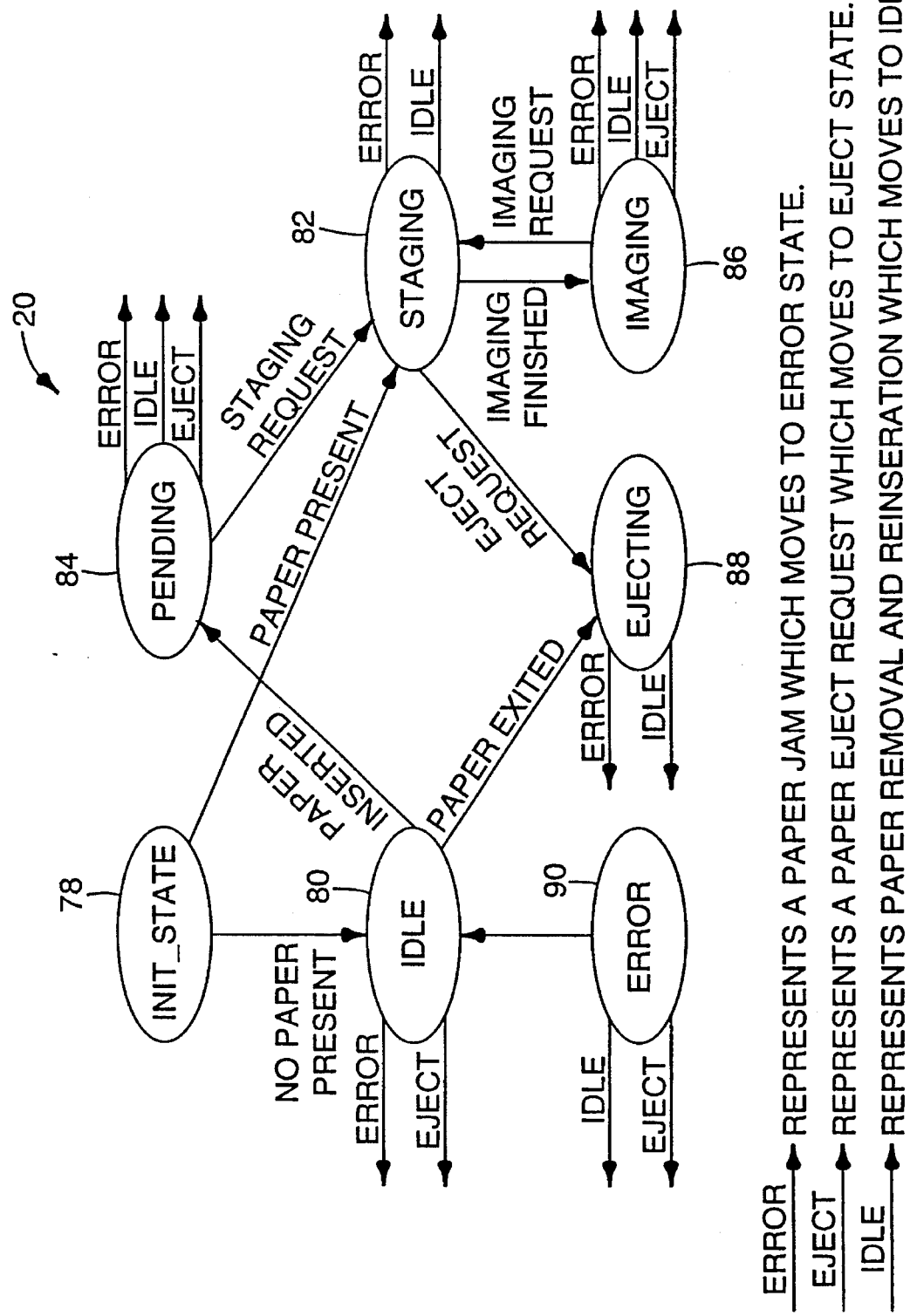
FIG. 6 is a state diagram of a blackline original document handler as a preferred embodiment of an input media module of an imaging apparatus of the present invention.

The operation of an exemplary input media module 20 can be illustrated by reference to FIG. 6 showing the operation of a blackline original document handler.

The function of "Init" state 78 is to determine if there is paper in imaging apparatus 10, to position the paper in a useful position if it is present and to vector to the correct starting state. If there is no paper in the apparatus 10 at start-up, a transition will be made to "Idle" state 80. If paper is found under front sensors but not under a rear sensor, the paper is properly positioned, a transition is made to "Staging" state 82. If the rear sensor is blocked, the motor is turned on and a transition is made to "Idle" state 80 which will handle the trailing edge with the rear sensor correctly. If both front and rear sensors are unblocked, the motor will be turned on to check for paper held by the rear roller but out of sensor range. If paper was in the rear roller, there will be a leading edge on the rear sensor which will cause transition to "Idle" state 80. If no leading edge is found, it is assumed that the paper path is clear and the motor is turned off before transition to "Idle" state 80. If transition is made to "Staging" state 82, a semaphore will be set to indicate that the document handler has a blackline original. The "Init" state 78 does not produce any errors.

"Idle" state 80 waits for paper to be inserted into the front of imaging apparatus 10. When paper is inserted, input media module 20 starts the attempt to draw the paper in past the first roller to a front sensor. This is done by starting the motor and a transition is made to "Pending" state 84. "Idle" state 80 also handles the case of when paper is already in imaging apparatus 10 and "Init" state 78 has the paper moving to position the paper in a usable position allowing the paper to be measured when it is staged. Once there is a trailing edge from the paper at the rear sensor, the motors are shut down and a transition is made to "Staging" state 82. A semaphore indicating that the document handler has a blackline original. "Idle" state 80 may cause an error to be produced if the paper does not reach one of the front sensors in a given amount of time.

"Pending" state 84 has two conditions. In the first condition, the paper reaches a front sensor. In this case, a semaphore indicating a blackline original is signalled and a transition is made to "Staging" state 82. In the second condition, the paper reaches the other front sensor again. This indicates that the user removed the paper before it reached the second front sensor and reinserted the paper. Input media module 20 responds by again signalling the arrival of the paper at the other front sensor and a transition is made to "Idle" state 80. This allows "Idle" state 80 to set up the time out parameters and to control the motor correctly. When "Pending" state 84 passes control to "Staging" state 82, a semaphore indicating the input media module 20 has a blackline original will be signalled.

In "Staging" state, input media module 20 will wait for a request to stage the document. When this command is received, the document will be moved from the front of imaging apparatus 10 to the rear. If this is the first staging request for this document, the movement will be slow so that the time between the leading and trailing edges of the document can be measured. The paper speed and the time to pass a sensor are known values so the paper length can be calculated. On subsequent staging of the same document, the document is moved at high speed to reduce waiting time. Once the paper is in position, the drive clutch is opened and the motor is stopped. When the exposure lamps come up to temperature, a ready semaphore will be signalled indicating that the blackline original is ready to be scanned and a transition will be made to "Imaging" state 86.

If the user removes and reinserts the paper, a semaphore indicating document unload is signalled and a transition is made to "Idle" state 80. This allows the timing and motors to be controlled from one place for document insertion.

"Staging" state 82 can produce two errors. An error can occur while waiting for a document leading edge at a front sensor and while waiting for a document trailing edge at that sensor. An error condition causes a transition to "Error" state 90.

In "Imaging" state 86 input media module 20 is waiting for a request to image the document. When this command is received the document will start moving at scanning speed towards the exposure lamps and the lens array. When the document is positioned about 75 millimeters before the lens array, a semaphore indicating synchronization will be signalled to alert the product executive that the imaging will start shortly. When the paper has fully passed the lens a semaphore will be signalled indicating that imaging is finished. The paper will be stopped before the trailing edge passes a front sensor. A transition is made to "Staging" state 82 to await further instructions.

If the user removes and reinserts the paper, a semaphore indicating document unload will be signalled and a transition is made to "Idle" state 80.

"Imaging" state 86 can produce an error upon a paper jam and a transition is made to "Error" state 90.

"Ejecting" state 88 will attempt to eject a document from imaging apparatus 10. This is done by turning on the document motor in the forward direction and then waiting until all sensors are clear. Once all sensors are clear, a semaphore indicating document unload, will be signalled and a transition is made to "Idle" state 80. "Ejecting" state 88 can be entered from any other state. Transition occurs when an external module requests that the document be ejected. A transition can occur from "Ejecting" state 88 to "Error" state 90 if all sensors are not cleared in a set amount of time indicating a paper jam.

"Error" state 90 can be entered in two ways. The first occurs if there is a paper jam and the jam timer expires. The second occurs if an error of a high enough level to terminate processing is posted (semaphore set). If any module in imaging apparatus 10 posts an error that shuts a module down, an attempt will be made to eject the document first. After either of these events, input media module 20 will stay in "Error" state 90 until the error semaphore is cleared and there is no paper in the document path. Once the error is cleared, a transition is made to "Idle" state 80.

While input media module 20 has been illustrated as being a blackline original document handler, it is recognized and understood that similar procedures and Construction would be utilized to implement a image card handler.

Image Retrieval Module

Figure 7A:
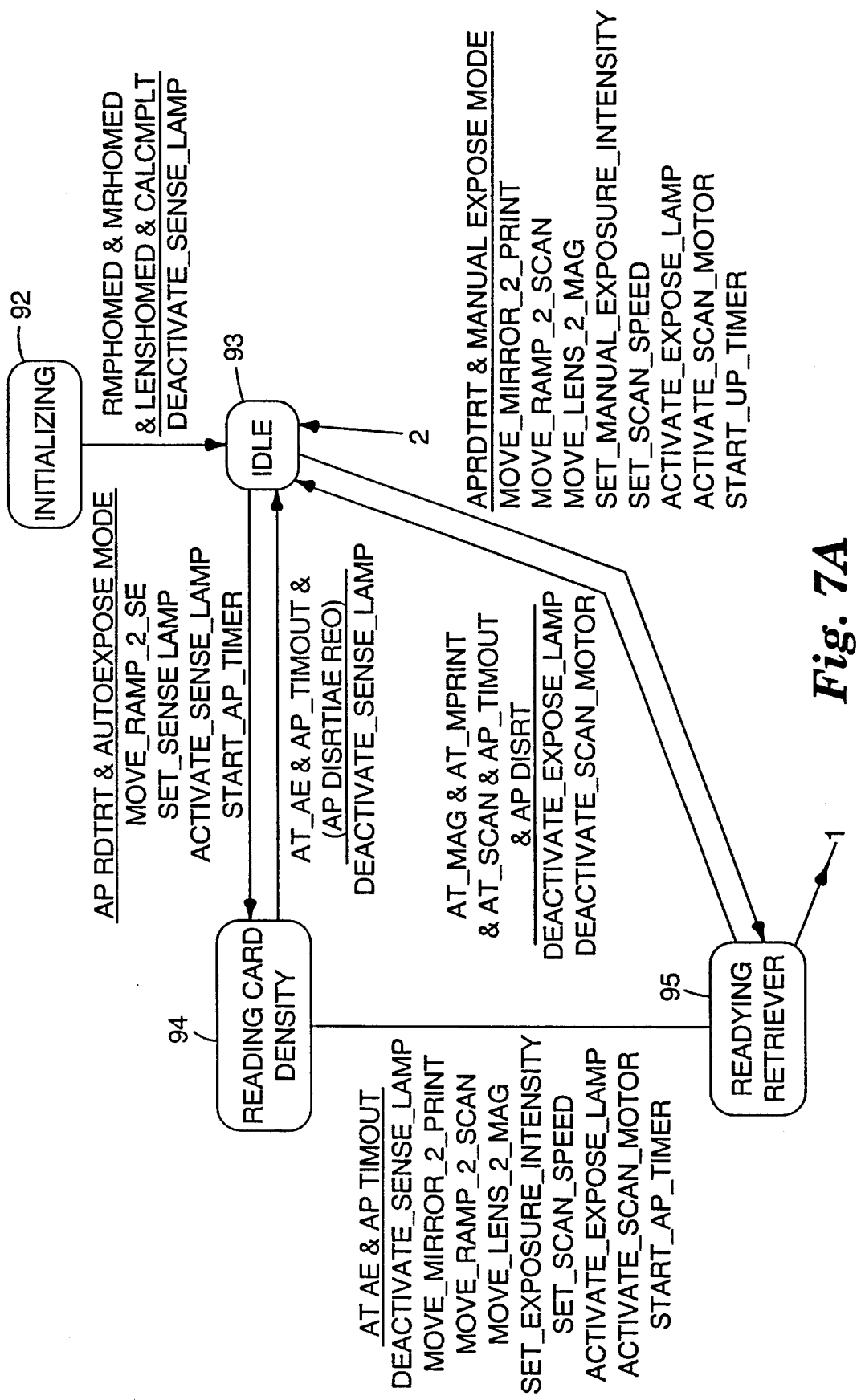
FIGS. 7A and 7B illustrate a state diagram of an image retrieval module of an imaging apparatus of the present invention.
Figure 7B:
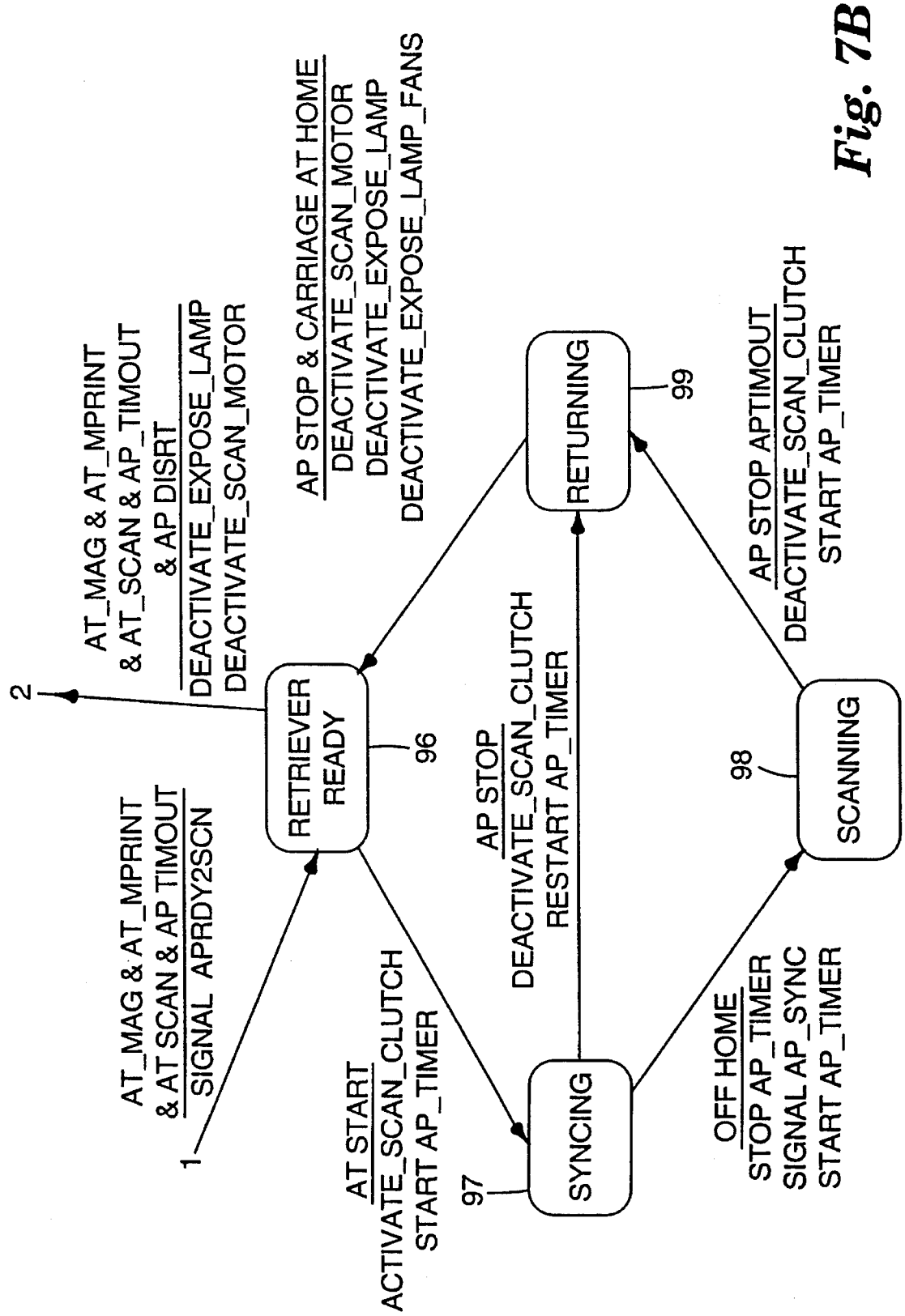
Figure 7C:
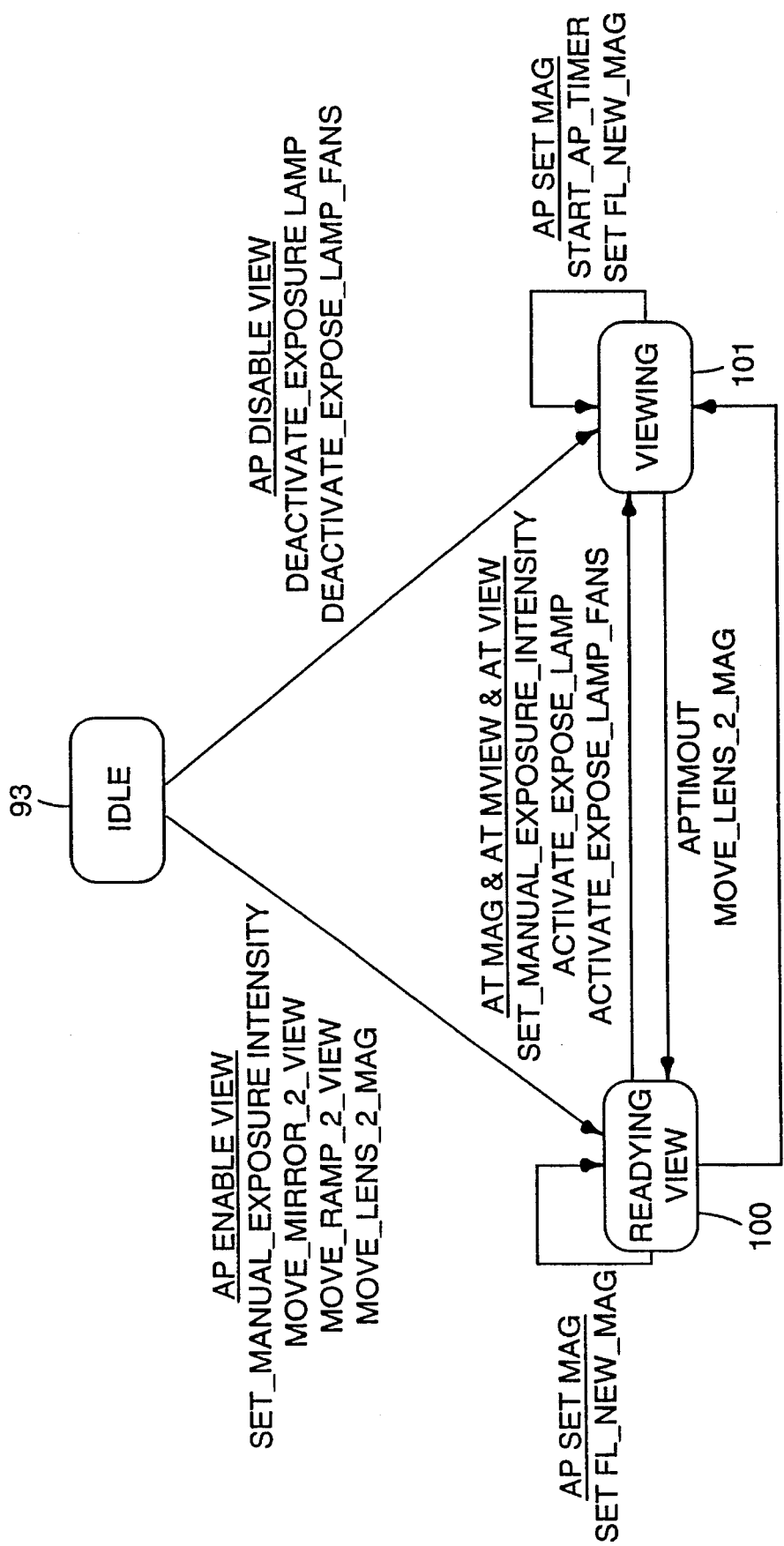

An exemplary implementation of an image retrieval module 22 is illustrated by the state shown in FIGS. 7A and 7B. While image retrieval module 22 has been illustrated as retrieving an image from a micrographic card, it is recognized and understood that similar procedures and construction would be utilized to implement an image retrieval module to retrieve an image from a blackline original.

Upon power-up, image retrieval module 22 is in "Initializing" state 92. In "Initializing" state 92, the card ramp is sent to the home position, the mirror is sent to the home position, the lens is sent to the home position and the unit is calibrated. Upon completion of these tasks, a transition is made to "Idle" state 93.

Upon receipt of a ready retriever command from the product executive module, a transition is either made to "Reading Card Density" state 94, if auto-expose mode is set, or directly to "Readying Retriever" state 95, if auto-expose mode is not set. Upon transition to "Ready Card Density" state 94, the ramp is moved to the auto-expose position, the intensity level of the sense lamp is set, the sense lamp is activated and a timer is started to allow the sense lamp to reach the proper intensity. Upon transition from "Idle" state 93 to "Readying Retriever" state 95, the mirror is moved to print position, the ramp is moved to scan position, the lens is set to the proper magnification, a manual exposure intensity level is set, the scan speed is set, the expose lamp is activated, the scan motor is activated and a timer is set to allow the expose lamp to reach the proper intensity.

From "Reading Card Density" state 94, upon the apparatus reaching auto-expose position and the expiration of the sense lamp timer, a transition is made to "Readying Retriever" state 95 and the following activities are accomplished. The sense lamp is deactivated, the mirror is moved to the print position, the ramp is moved to the scan position, the lens is moved to the proper magnification, the intensity level of the exposure lamp is set, the scan speed is set. Further, the exposure lamp is activated, the scan motor is activated and a timer is set to ensure that the exposure lamp achieves proper intensity. On the other hand, if a disable retriever command is received, the sense lamp is deactivated and a transition is made back to "Idle" state 93.

In "Readying Retriever" state 95, when the lens is at the proper magnification, the mirror is in the print position, the card is at the scan position and the timer has expired, then a semaphore indicating ready to scan is set and a transition is made to "Retriever Ready" state 96. However, if a disable retriever command is received, the exposure lamp is deactivated, the scan motor is deactivated and a transition is made back to "Idle" state 93.

In "Retriever Ready" state 96, the receipt of a start command initiates an activation of the scan clutch, a timer is started to make sure the carriage starts to move and a transition is made to "Syncing" state 97.

In "Syncing" state 97, once a sensor has determined that the carriage is off the home position, the timer is stopped, a semaphore is signalled indicating that the registration point has been reached, a new timer is set and a transition is made by "Scanning" state 98. A stop command from product executive module 46 will cause an immediate transition to "Returning" state 99 and the scan clutch will be deactivated and a new timer started. Once scanning is completed, as evidenced by the expiration of the timer, or if a stop command is received from the product executive module 46, a transition is made to "Returning" state 99 and the scan clutch is deactivated and a new timer is set.

In "Returning" state 99 a mechanical mechanism, e.g., a spring, is returning the carriage to the home position. Upon expiration of the timer and when the carriage is at the home position, the scan motor is deactivated, the exposure lamp is deactivated and the exposure lamp fans are deactivated and a transition is made back to "Retriever Ready" state 96. The image retrieval module 22 is then ready to retrieve another image. Upon receipt of a disable retriever command, the exposure lamp is deactivated, the scan motor is deactivated and a transition is made back to "Idle" State 93.

From "Idle" state 93 (see FIG. 7B), a transition is made to "Readying View" state 100 upon receipt of an enable view command. At the same time, the exposure intensity is set manually, the mirror is moved to view, the ramp is moved to view and the lens is moved to the proper magnification.

In "Readying View" state 100, a new magnification request will cause the lens to be set to a new magnification. When the lens is at the proper-magnification, the mirror is in the view position and the ramp is in the view position, a transition is made to "Viewing" state 101. At the same time, the intensity level of the exposure lamp is manually set, the exposure lamp is activated and the exposure lamp fans are activated.

In "Viewing" state 101, a new magnification request will cause the lens to be set to a new magnification. To prevent constant magnification searching, upon expiration of a timer, the lens will be set to the new magnification and a transition is made back to "Readying View" state 100. Upon receipt of a disable view command, the exposure lamp is deactivated, the lamp fans are deactivated and a transition is made back to "Idle" state 93.

Image Placement Module

Figure 8:
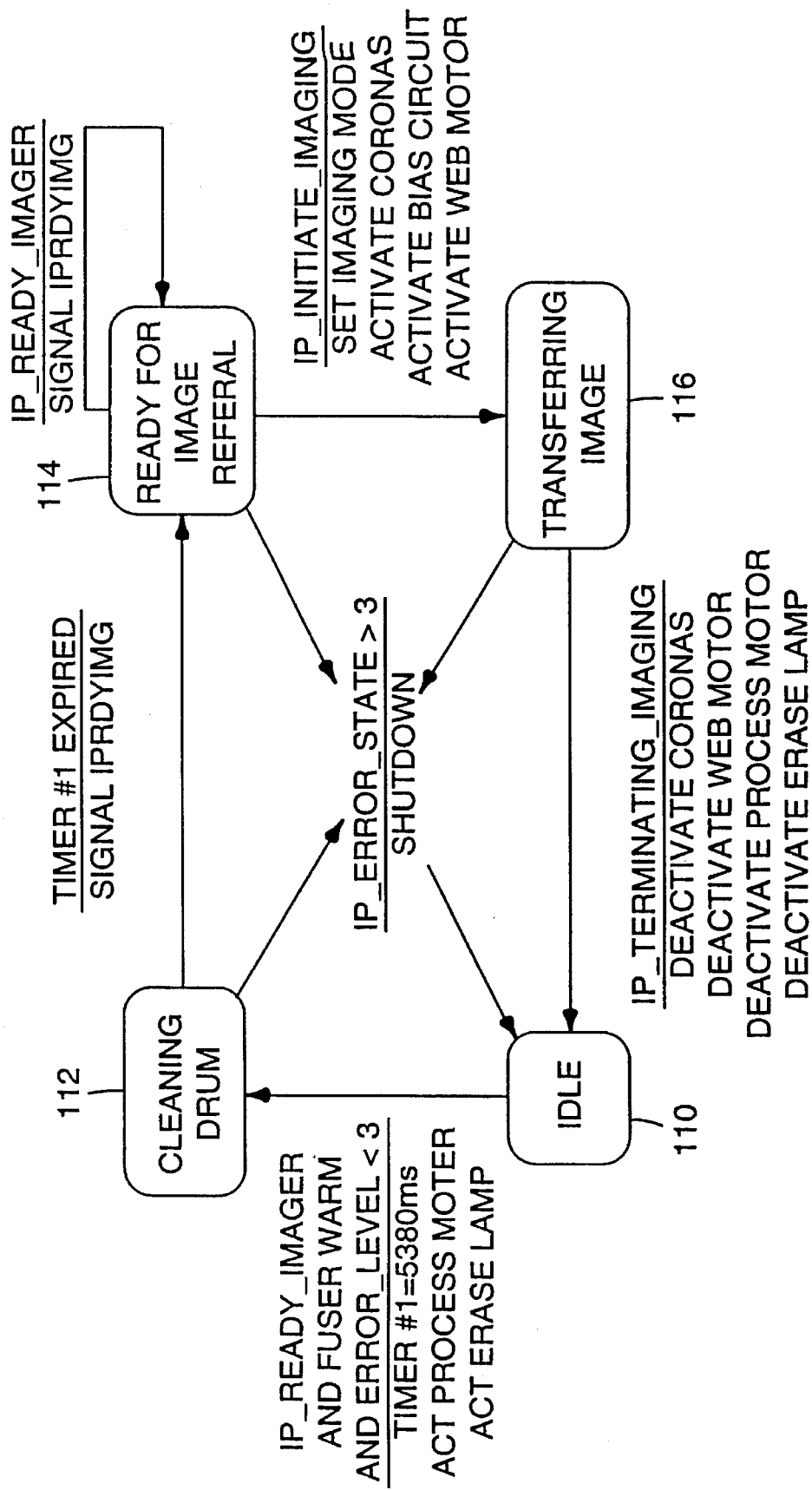
FIG. 8 is a state-diagram of an image placement module of an imaging apparatus of the present invention.
Figure 9:
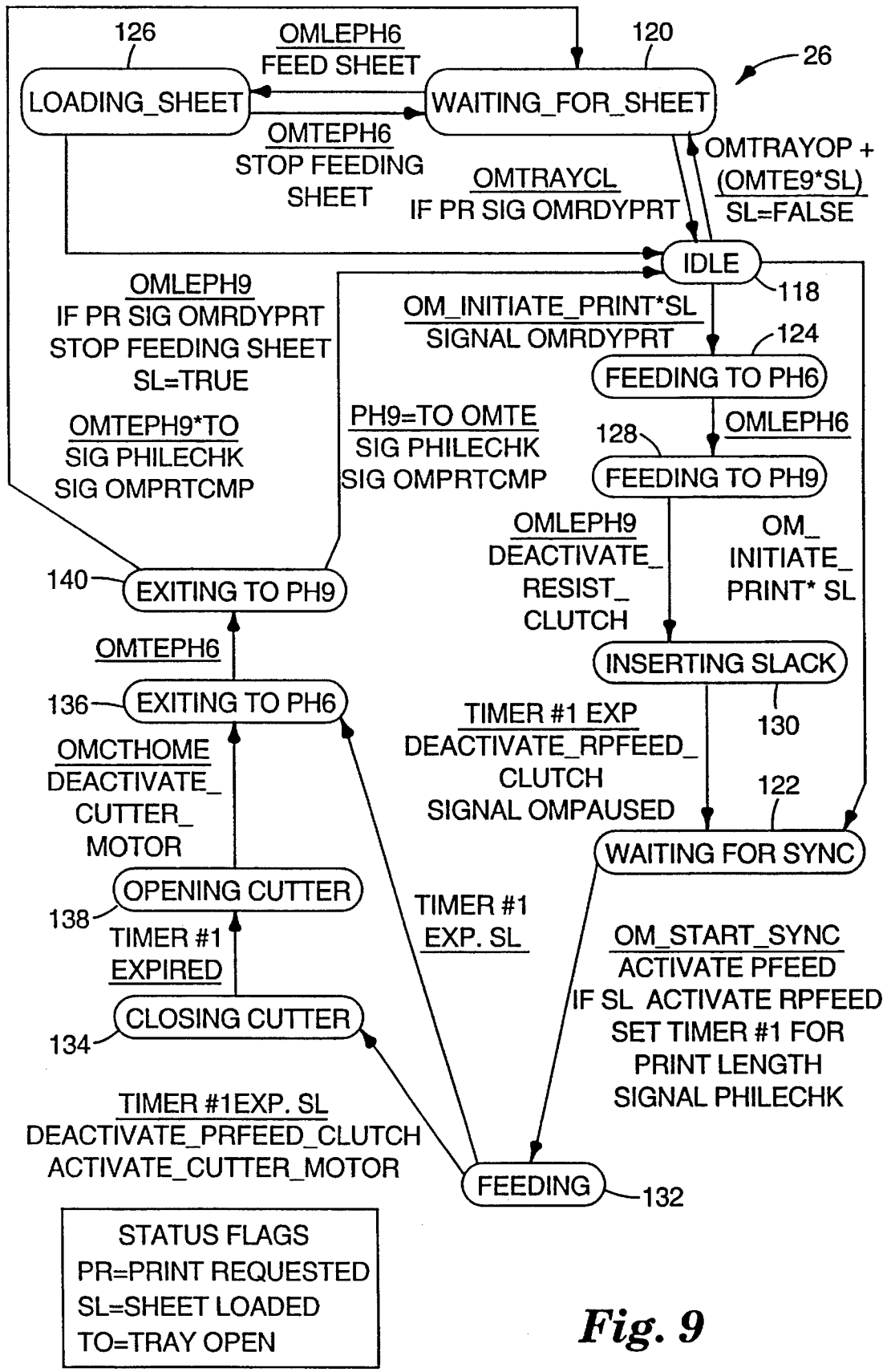
FIG. 9 is a state diagram of an output media module of an imaging apparatus of the present invention.

There are four basic states in image placement module 24 as illustrated in FIG. 8. An "Idle" state 110 is the normal state during non-imaging periods. Two events must occur to transition to "Cleaning Drum" state 112. This transition occurs if the fuser is at operating temperature and a ready imager request is received. These two events can occur in either order. Upon entering "Cleaning Drum" state 112, a timer is set to 5.38 seconds and started. This is the exact time for two complete revolutions of an electrophotographic drum. When the timer expires, the ready imager semaphore is set and a transition is made to "Ready For Image Transferal" state 114. At this point, the image placement module 24 is ready to begin imaging the output media. When an initiate imaging command is received, the rest of the process is activated and a transition is made to "Transferring Image" state 116. "Transferring Image" state 116 is maintained until a terminate image command is received or until an error condition is encountered.

Output Media Module

"Idle" state 118 is the initial state of output media module 26. Several events can cause output media module 26 to exit "Idle" state 118. First, a semaphore can indicate that the manual bypass tray has been opened. The result is the immediate transition to "Waiting For Sheet" state 120. Second, a semaphore can indicate that a trailing edge has been seen at a sensor. If a sheet has already been loaded this means that the user has pulled the sheet out of imaging apparatus 10 also causing a transition to "Waiting For Sheet" state 120. Third, a request print command may be received. If the current error level is less than three, a semaphore indicating ready to print is signalled. The assumption is that in "Idle" state 118, input media is ready. If imaging apparatus were waiting for a manual sheet, it would not be in "Idle" state 118. Thus, in "Idle" state 118, either the tray is closed or the tray is open and a sheet has been loaded. Fourth, an initiate print command may be received causing an immediate transition based upon the source media. If a manual sheet is loaded, output media module 26 moves to "Waiting For Sync" state 122. If a sheet has not been loaded, then the source media is roll feed and the roll paper feed clutch is activated and a transition is made to "Feeding to PH6" state 124.

"Waiting For Sheet" state 120 occurs when the manual bypass tray is open and output media module 26 is waiting for the user to insert a manual sheet, A semaphore may indicate that a leading edge transition has been seen at the manual feed sensor indicating that the user has fed a manual sheet. At this point, the paper feed clutch is activated and a transition is made to "Loading Sheet" state 126. Alternatively, a semaphore may indicate that the manual feed tray is closed and a transition back to "Idle" state 118 occurs. If a print request has been received, upon the transition to "Idle" state 118, the semaphore indicating ready to print is signalled indicating that the output is ready and available.

"Loading Sheet" state 126 indicates that output media module 26 is loading a sheet manually fed by the user. A semaphore may indicate that the user has removed the sheet and a return transition is made to "Waiting For Sheet" state 120. Alternatively, a semaphore may indicate that the sheet has been successfully loaded and a return is made to "Idle" state 118. If a print request has been received, upon the transition to "Idle" state 118, the semaphore indicating ready to print is signalled indicating that the output is ready to print.

In the "Feeding to PH6" state 124, output media module 26 is advancing the roll paper. A semaphore may indicate that the paper has reached its proper point. At this point, the jam timer is reset and a transition is made to "Feeding to PH9" state 128. Alternatively, the jam timer may expire indicating that the paper is jammed and an appropriate error is posted and a transition is may to "Idle" state 118.

In the "Feeding to PH9" state 128, the roll paper is being further advanced. A semaphore may indicate that the paper has reached its proper point at which time the feed clutch is deactivated, the timer is reset to insert the proper amount of slack and a transition is made to "Inserting Slack" state 130. Alternatively, the jam timer may expire indicating that the paper is jammed and an appropriate error is posted and a transition is may to "Idle" state 118.

While in "Inserting Slack" state 130, roll paper is being fed by maintaining the main motor and the roll paper feed clutch. However, paper is not advancing past sensor PH6 since the paper feed clutch is deactivated. This causes a buckle in the paper which is necessary for cutting. The only valid event is the expiration of the timer which indicates the appropriate amount of slack has been inserted into the paper. At this point, the paper feed clutch is deactivated and a transition is made to "Waiting For Sync" state 122.

In "Waiting For Sync" state 112 the output media (manual or roll source) has advanced to the synchronization point PH9 and is waiting for the start synchronization command. When the start synchronization command is received, a timer is set according to the requested print size, the correct clutches are activated to feed from the roll or from the bypass tray, a semaphore indicating that a background task should monitor the leading edge and a transition is made to "Feeding" state 132.

While in "Feeding" state 132, the output media is being fed through imaging apparatus 10. When the timer expires indicating the proper length has been fed, the roll paper feeder clutch is deactivated. Next, if the output media source was roll, the cutter motor is activated and a transition is made to "Closing Cutter" state 134. If the output media source was a manual sheet, a transition is made to "Exiting To PH6" state 136. Alternatively, a trailing edge can be seen at PH6 indicating that the user inserted a manual sheet which was smaller than the requested print size. In this case, a transition is made to "Exiting To PH6" state 136.

In "Closing Cutter" state 134, the paper is being cut. The paper is still advancing through imaging apparatus 10 but no paper is being taken from the roll. This is accomplished by taking up the slack, or buckle, which was placed in the media earlier. The expiration of the timer indicates that the cutter has moved halfway through its revolution and should be closed. A transition occurs to "Opening Cutter" state 138.

In "Opening Cutter" state 138, the paper has been cut and the cutter is returning home. A semaphore may indicate that the cutter has safely returned home causing the cutter motor to be deactivated, a jam timer started and a transition made to "Exiting To PH6" state 136. Alternatively, the expiration of an error timer indicates that the cutter did not return home and is stuck. The appropriate error is lodged and a transition is made to "Idle" state 118.

In "Exiting To PH6" state 136, the trailing edge of paper is being fed to sensor PH6. A semaphore may indicate that the paper has arrived at sensor PH6 in which case a jam timer is started and a transition is made to "Exiting to PH9" state 140. Alternatively, the jam timer may expire indicating that the trailing paper edge was not seen at sensor PH6 in time and the paper has jammed. The appropriate error is lodged and a transition is made to "Idle" state 118.

In "Exiting To PH9" state 140, the trailing edge of the paper is being fed to sensor PH9. A semaphore may indicate that the trailing edge of the paper has arrived at sensor PH9 in which case the print has been successfully cut and has exited the critical regions of imaging apparatus 10. A semaphore indicating print complete is then signalled indicating that other requests for prints are valid. A semaphore requesting a background task monitor for the trailing edge of the paper. Finally, the paper feed clutch is deactivated and a transition is made to "Idle" state 118. Alternatively, the jam timer may expire indicating that the trailing paper edge was not seen at sensor PH9 in time and the paper has jammed. The appropriate error is lodged and a transition is made to "idle" state 118.

User Interface Module

Figure 10:
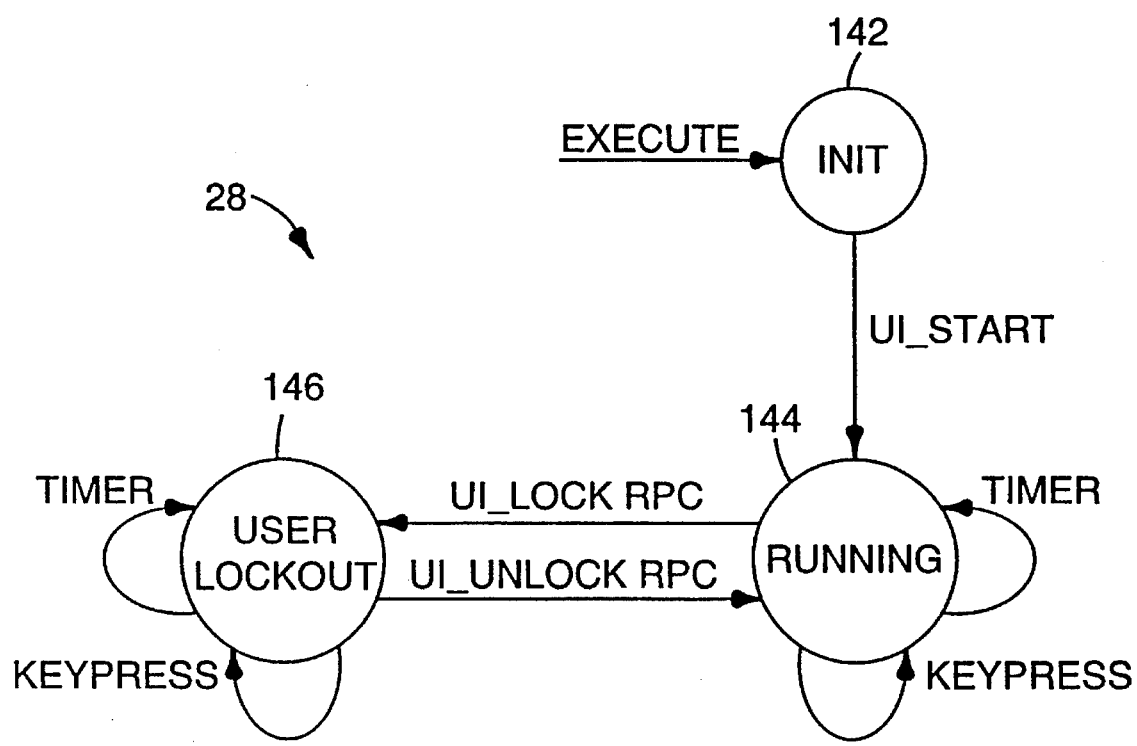
FIG. 10 is a state diagram of a user interface module of an imaging apparatus of the present invention.

An exemplary implementation of a user interface module 28 is illustrated by the state diagram shown in FIG. 10. Upon power-up, user interface module enters "Init" state 142 and starts initializing all shared data variables. The screen displays the 3M logo. All commands are ignored until the user interface execute command is received which indicates that the imaging apparatus 10 is ready to interface with the user. When this command is received, the opening menu is displayed and a transition is made to "Running" state 144.

During "Running" state 144, three events are possible. First, the user may press a key. If this occurs, the corresponding action is performed. This action may be many things including entering a number, switching screens, displaying helpful information or sliding an LED bar. Second, a periodic timer may expire. In this event, all shared variables are examined. If a variable has .changed, the corresponding screen is updated. Third, remote procedure calls are serviced. If a user interface lock command is received, a transition is made to "User Lockout" state 146.

While in "User Lockout" state, all user key presses are ignored. Thus, the user cannot change screens or enter data, however, the screen displays important system (apparatus-)information. This mode is typically used during critical times when the user is not allowed to alter the system. One example is during printing. If the user interface unlock command is received, a transition is made back to "Running" state 144.

SUMMARY

Thus, it can be seen that there has been shown and described a novel invention as described above. It is to be recognized and understood, however, that various changes, modifications and substitutions in the form and the details of the present invention may be made by those skilled in the art without departing from the scope of the invention as defined by the following claims.

What is claimed is:

1. An imaging apparatus, controllable by a user, for receiving input media containing an image, retrieving said image from said input media, placing said image onto an output media and outputting said output media, comprising:

input media control means adapted to receive said input media for providing software control to receive said input media containing said image;

image retrieval means for retrieving said image from said input media;

image placement means for placing said image onto said output media;

output media control means for outputting said output media; user interface means for allowing control by said user over said apparatus; and product executive means for governing and synchronizing each of said input media control means, said image retrieval control means, said image placement means, said output media control means and said user interface means;

wherein said product executive means has one-way downward communication with each of said input media control means, said image retrieval control means, said image placement means, said output media control means and said user interface means;

wherein there is no direct communication between said input media control means, said image retrieval control means, said image placement means, said output media control means and said user interface means; and wherein each of said input media control means, said image retrieval control means, said image placement means, said output media control means and said user interface means are independent of each other.

2. An apparatus, controllable by a user, for providing software control for a plurality of imaging products adapted to receive input media containing an image and adapted to output an output media, each of said plurality of products using a particular process, comprising:

reusable input media control means adapted to receive said input media for providing software control to receive said input media containing said image;

reusable image retrieval means for retrieving said image from said input media;

reusable image placement means for placing said image onto said output media;

reusable output media control means for outputting said output media;

reusable user interface means for allowing control by said user over said apparatus; and product executive means, unique for each of said plurality of products, for governing and synchronizing each of said reusable input media control means, said reusable image retrieval control means, said reusable image placement means, said reusable output media control means and said reusable user interface means;

wherein said product executive means initiates all communication with each of said reusable input media control means, said reusable image retrieval control means, said reusable image placement means, said reusable output media control means and said reusable user interface means;

wherein said product executive means has one-way downward communication with each of said reusable input media control means, said reusable image retrieval control means, said reusable image placement means, said reusable output media control means and said reusable user interface means;

wherein there is no direct communication between said reusable input media control means, said reusable image retrieval control means, said reusable image placement means, said reusable output media control means and said reusable user interface means; and wherein each of said reusable input media control means, said reusable image retrieval control means, said reusable image placement means, said reusable output media control means and said reusable user interface means are independent of each other.

3. An apparatus as in claim 2 wherein said product executive acts as a client to each of said reusable input media control means, said reusable image retrieval control means, said reusable image placement means, said reusable output media control means and said reusable user interface means and each of said reusable input media control means, said reusable image retrieval control means, said reusable image placement means, said reusable output media control means and said reusable user interface means act as a server to said product executive means.

4. An apparatus as in claim 2 wherein said product executive communicates with each of said reusable input media control means, said reusable image retrieval control means, said reusable image placement means, said reusable output media control means and said reusable user interface means by means of remote procedure calls.

5. An apparatus as in claim 2 wherein at least one of said reusable input media control means, said reusable image retrieval control means, said reusable image placement means, said reusable output media control means and said reusable user interface means comprises a plurality of subtrees, wherein said one of said reusable input media control means, said reusable image retrieval control means, said reusable image placement means, said reusable output media control means and said reusable user interface means initiates all communication with said plurality of subtrees, wherein there is no direct communication between said plurality of subtrees, and wherein each of said plurality of subtrees are independent of each other.

6. An apparatus as in claim 2 wherein said input media comprises a micrographic card, an original blackline print or a digital file.

7. An apparatus as in claim 2 wherein said output media comprises a micrographic card, an original blackline print or a digital file.

8. A method of providing software control for a plurality of imaging products adapted to receive input media containing an image and adapted to output an output media, each of said plurality of products using a particular process, comprising:

creating reusable input media control software adapted to receive said input media for providing software control to receive said input media containing said image;

creating reusable image retrieval software for retrieving said image from said input media;

creating reusable image placement software for placing said image onto said output media;

creating reusable output media control software for outputting said output media;

creating reusable user interface software for allowing said user control over said apparatus; and creating product executive software, unique for each of said plurality of products, for governing and synchronizing each of said reusable input media control software, said reusable image retrieval control software, said reusable image placement software, said reusable output media control software and said reusable user interface software;

wherein said product executive software initiates all communication with each of said reusable input media control software, said reusable image retrieval control software, said reusable image placement software, said reusable output media control software and said reusable user interface software;

wherein said product executive means has one-way downward communication with each of said reusable input media control means, said reusable image retrieval control means, said reusable image placement means, said reusable output media control means and said reusable user interface means;

wherein there is no direct communication between said reusable input media control software, said reusable image retrieval control software, said reusable image placement software, said reusable output media control software and said reusable user interface software; and wherein each of said reusable input media control software, said reusable image retrieval control software, said reusable image placement software, said reusable output media control software and said reusable user interface software are independent of each other.

* * * * *